Aug. 2, 1938.  E. L. FONSECA  2,125,627
THERMOSTAT FOR ELECTRIC RANGES
Filed June 20, 1934
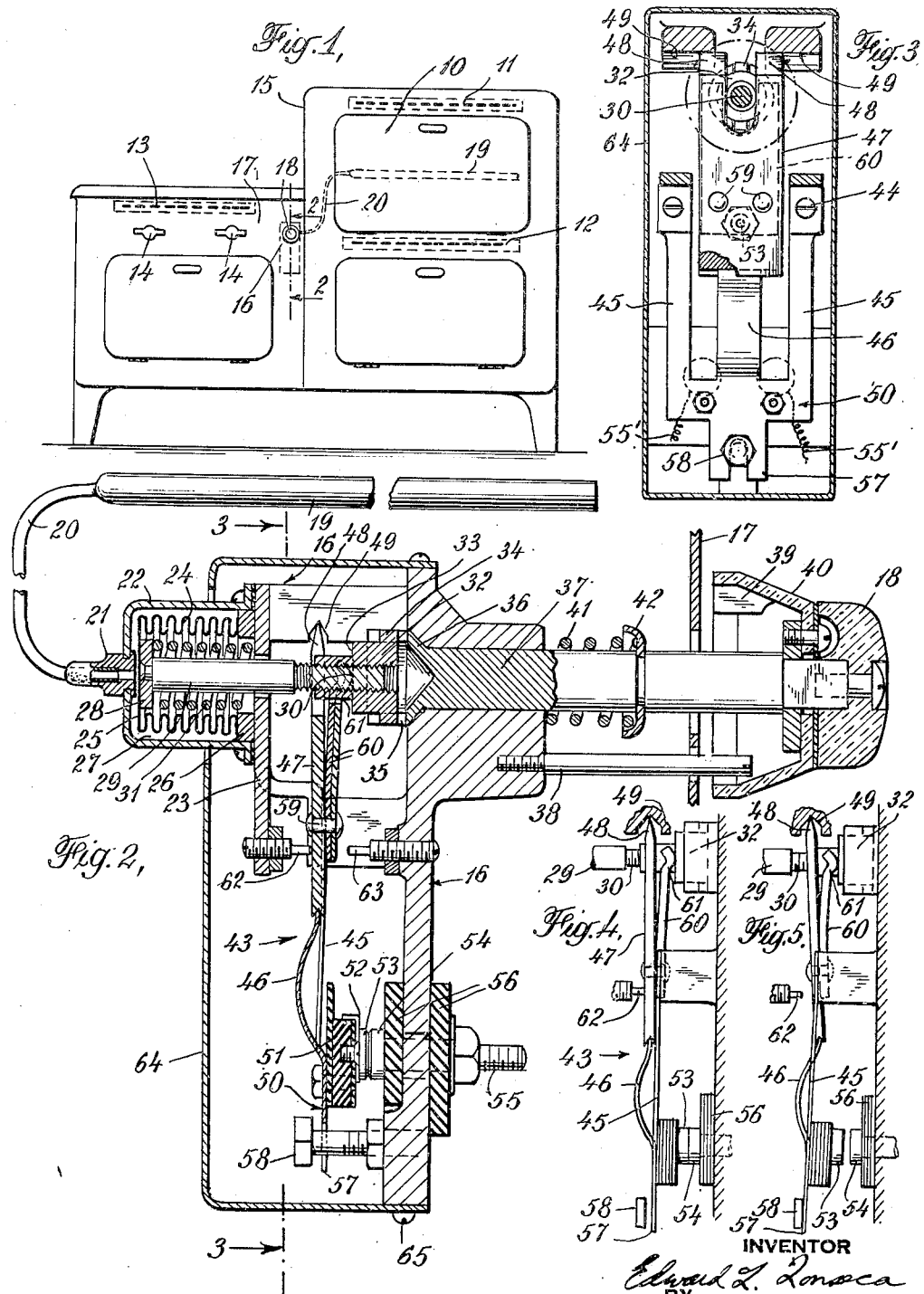
INVENTOR
Edward L. Fonseca
BY
ATTORNEYS Patented Aug. 2, 1938

2,125,627

UNITED STATES PATENT OFFICE 2,125,627

THERMOSTAT FOR ELECTRIC RANGES

Edward L. Fonseca, Newark, N. J., assignor to The Wilcolator Company, Newark, N. J., a corporation of Delaware Application June 20, 1934, Serial No. 731,403

11 Claims. (Cl. 200—83)

This invention relates to thermostatic regulators and has particular reference to thermostatic regulators for application to electric stoves, ranges and other heaters for controlling the temperature within the oven or other heated space.

Thermostatic regulators for electric ranges have been to a very large extent of the relay type in which a thermostat, expanding and contracting in response to temperature changes in the oven, actuated a switch for opening and closing the circuit of a relay, which accordingly controlled the full-load current supplied to the electric heater of the oven. This arrangement not only required expensive and bulky relay apparatus but required two circuits, the relay circuit and the heating circuit, because the relatively delicate thermostat switch could not be employed for directly making and breaking the full-load heating current.

This situation was subsequently somewhat improved by the employment of a mercury switch capable upon tilting by the thermostat of directly making and breaking the full-load heating current, but because the thermostat is directly connected to the mercury switch in order to impart tilting movement to the latter the regulator can only be mounted in a particular position, so that it has little installation flexibility, especially on the new console or table top types of ranges, in which the inner wall of the oven is so low that when it is attempted to mount the regulator in the usual place on that wall, it is so close to the outer heaters that it is not only liable to injury by pots and pans but its accuracy of operation is seriously disturbed by the transmission of the extraneous heat from these outside heaters to the thermostat. Also, due to its proximity to the outside heaters, the handle of this regulator mounted in that position frequently becomes uncomfortably hot and as it is necessary to reach over at least one outside heater to operate the regulator, there is danger of burning the hand and igniting clothing. Furthermore, the installation of this type of regulator requires cutting a large hole through the wall and insulation of the oven, and the location of the thermostat adjacent the upper heater in the oven in a heat zone having a temperature higher than that in the zone in which the broiling or the like operations actually take place, so that the broiling heat is lower than intended.

In accordance with the present invention, a thermostatic regulator for the oven of an electric range or the like is provided, which is effective to directly make and break the full-load current of the oven heater without arcing and without the necessity of employing relay or relatively large mercury switches; which is so flexible that it can be installed on any type of electric range and at any desired point thereon with the thermo-sensitive element located in the actual heat zone where the cooking and baking operations take place; in which this may be done with a minimum of labor and without cutting large holes in the oven wall and insulation; and which is immune to the influence of the exterior heaters or other sources of extraneous heat regardless of the location of the regulator with respect to the source of extraneous heat.

The invention comprises a bulb, adapted to be located in the baking or cooking zone of the oven, connected by a flexible capillary tube to an expansible and contractible chamber, such as a metal bellows, mounted on a casing located at any desirable point on the range and operatively connected to an improved form of snap switch controlling the full-load current connections to the heater in the oven. The connections between the switch and the bellows are adjustable at will by means of a handle, so that the switch will be operated by the bellows at any selected oven temperature. The bulb, tube and bellows are completely filled with a non-metallic liquid, which responds to temperature variations in the oven by changing its volume to expand and contract the bellows, and which retains its liquidity throughout the operating temperature range of the oven. A liquid-filled thermostatic apparatus having these characteristics is described in detail in my copending application, Serial No. 709,692, filed February 5, 1934 (now Patent No. 1,978,362, granted October 23, 1934).

The switch comprises a flexible metal strip having two legs anchored at their ends, and an intermediate leg distorted out of the plane of the other legs and loosely connected to one end of a rigid bar pivoted on the casing at its other end and connected intermediate its ends to the thermostat bellows and adjusting handle. The switch is biased toward open position, but is held under tension in normally closed position by the bellows spring at oven temperatures below a predetermined maximum degree, so that contacts on its free end normally engage fixed contacts to close the circuit of the oven heater. The tension on the strip causes it to rapidly separate the contacts with a snap action when the rigid bar thereof is released by expansion of the bellows in response to a temperature rise in the oven. Stops restrain the flexible strip from moving to the extreme contact-opening position to which it is urged by its distorted intermediate leg, so that only a slight re-application of pressure thereon by the bellows spring in response to a temperature drop in the oven results in restoration of the switch to its contact-closing position, only a slight movement of the thermostat bellows being necessary to move the switch in either direction, so that the instrument is extremely sensitive and positive in its operation.

Also interposed in the connections between the thermostat bellows and the switch, is a compensating thermostat which responds with the oven thermostat to the extraneous temperatures, but which acts oppositely to the oven thermostat, so as to nullify the effects of the extraneous temperatures on the oven thermostat, whereby the latter responds accurately only to temperature changes in the oven. Accordingly, the new instrument may be mounted anywhere on the range without regard to proximity to outside burners, since the compensating thermostat prevents the heat of the outside burner from affecting the operation of the oven thermostat. A thermostatic regulator embodying compensation is disclosed in my copending application, Serial No. 575,525, filed November 17, 1931. It is to be understood, however, that the present invention need not be associated with the self-compensating feature, but may be employed with equal facility without it, depending upon the location of the regulator on the range or other electric heater.

For a more complete understanding of the invention, reference may be had to the accompanying drawing, in which Figure 1 illustrates one way of mounting the new regulator on an electric range of the console type;

Figure 2 is an enlarged longitudinal section through the regulator as seen along the line 2—2 of Figure 1;

Figure 3 is a cross-section through the regulator as seen along the line 3—3 of Figure 2; and Figures 4 and 5 are partial sectional views of the regulator showing the switch in closed and open positions, respectively.

Referring to Figure 1 of the drawing, an electric range of the console type is illustrated thereby, this range including the oven 10 having conventional upper and lower electric heating elements 11 and 12, respectively, and a series of outside electric heaters 13 turned on and off by switches 14 or the like. As illustrated in Figure 1, the inner side wall 15 of the oven 10 is so low that it is impracticable to mount the usual thermostatic regulator on this wall because, not only is it so close to the open exterior heaters 13 as to be liable to injury from cooking utensils moved around on the open heaters 13, but it is also in the heat zone of the exterior heaters 13. This extraneous heat makes the adjusting handle uncomfortably hot, and thermostatically disturbs the operation of the thermostat, so that its response varies with the turning on and off of the exterior burners instead of only with variations in the oven temperature.

With the present invention the regulator need not be mounted in the usual place on the inner wall 15 of the oven 10, but may be mounted anywhere, regardless of the heat emitted by the exterior heaters 13. For example, the body 16 of the regulator, may be mounted below the exterior heaters 13 and behind the front panel 17, so that no part of it is visible or projects through the panel but the adjusting knob 18, whereby the pleasing and less utilitarian appearance of the modern range is preserved. This optional positioning of the new regulator is rendered possible both by the flexible connection of the thermostat bulb 19, which is afforded by the flexible metal capillary tube 20, and also because the regulator is self-compensating to eliminate the disturbing effects of the heat emitted by the exterior heaters 13, no matter how close to these heaters the regulator body 16 is located. Also because of this flexibility of the new regulator, the bulb 19 may be mounted in the oven in whatever position therein is found to be productive of the best results, instead of having its position determined by reference to the construction of the controller and the position desired for the operating handle of the controller.

The capillary tube 20, communicating at one end with bulb 19, is sealed at its other end in nipple 21 communicating with the interior of a cup 22, secured to a bracket 23 mounted on the body 16 of the regulator. Located within this cup 22 is a flexible metal bellows 24 which is closed at its inner end 25 and sealed at its outer end to the ring 26 which in turn is sealed to the inner wall of the cup 22, so that an annular chamber 27 is formed between the outer surface of the bellows 24 and the interior surface of the cup 22, the volume of which varies with the expansion and contraction of the bellows 24.

The bulb 19, the capillary tube 20 and the chamber 27 are completely filled with a non-metallic liquid having thermostatic properties and retaining its liquidity from lowest probable room temperature to 650° F., which approximates the maximum operating temperature of the oven 10. A suitable liquid for this purpose is chlorinated diphenyl, as disclosed in my aforementioned copending application, Serial No. 709,692.

Engaging the bottom or inner end 25 of the bellows 24 is a disc 28 secured to the inner end of a rod 29, which is threaded at its outer end 30 and is guided for axial movement in an opening in bracket 23 of the regulator. A spring 31 interposed between disc 28 and the surface of bracket 23 normally urges the bellows 24 toward distended position. Mounted on the threaded outer end 30 of the rod 29 is a nut 32, having a shoulder 33 and keys 34 which are axially slidable in slots 35 of a bearing cone 36 rotatable in a conical seat in the body 16 and forming part of a shaft 37 extending through panel 17 and carrying the adjusting knob 18 which lies in front of the panel 17. A stop pin 38 on the body 16 is arranged to be engaged by a stop lug 39 on the under side of the graduated dial 40 of knob 18 to limit the rotation thereof. A spring 41 interposed between the body 16 and a disc 42 on shaft 37 holds the cone 36 against its conical seat in the valve body 16 and also holds the knob 18 in any adjusted position. It will be observed that rotation of the knob 18 causes nut 32 to be screwed along the threaded outer end 30 of rod 29 to vary the relationship between the bellows 24 and the shoulder 33 of nut 32.

Carried by the body 16 is a snap switch 43, the principal element of which comprises an elongated, thin strip of resilient metal which is slit longitudinally to form two lateral legs 45 and an intermediate leg 46. The ends of the lateral legs 45 are anchored to the body 16 by screws 44, and the intermediate leg 46 is distorted out of the plane of the lateral legs 45 and held in this position by a rigid bar 47 having a notch in one end receiving the free end of leg 46 and having a knife edge 48 at its other end which is seated for pivotal movement in a transverse notch 49 in the body 16. The free end 50 of the flexible strip carries an insulating block 51 on which is loosely supported at its center point a conducting plate 52 having two spaced contacts 53 adapted to engage two corresponding spaced contacts 54 secured on the inner ends of binding posts 55, which are insulated from each other and from body 16 by insulating plates 56, and which are connected by wires 55' in the circuit of the oven heaters 11 and 12. The free end 50 of the switch strip is provided with a slotted extension 57 embracing a stop bolt 58 adjustably mounted on body 16 for limiting the outward movement of the switch strip during its contact-opening movement. The pivoted end of the rigid bar 47 of switch 43 is slotted for passage of the threaded end 30 of rod 29.

Secured at one end by rivets 59, or the like, to the bar 47 is a bi-metallic thermostat 60, the other or free end of which is notched and is provided with a transverse ridge 61 resting on the shoulder 33 of nut 32 whereby the shoulder functions as an actuator for the snap switch. The bi-metallic strip 60 is so arranged that its free end 61 flexes away from bar 47 in response to a rise in temperature extraneous to the oven 10 and flexes toward the bar 47 in response to a drop in temperature extraneous to the oven 10, so that the effective relationship between the switch and the bellows 24 is varied thermostatically in response to changes in extraneous temperatures. The flexure of compensating thermostat 60 away from bar 47 in response to an increase in the extraneous temperature is indicated in Figure 5.

Adjustable stop pins 62 and 63 are located on bracket 23 and on body 16, respectively, at either side of bar 47 and bi-metallic strip 60, so as to limit the movement of the switch to either side of its dead center position. The open switch position illustrated in Figure 5 is the normal position of the switch, the strip being biased to this position by the tension imposed by distorted intermediate leg 46. In this position, limited by stop 58, the free end of the intermediate leg 46 lies slightly to the right side of the lateral legs 45 as seen in Figure 5. Movement of the nut 32 to the left, as when the bellows 24 distends, produces a pressure, swinging bar 47 to the left about its knife blade pivot 48, until the free end of leg 46 is moved slightly to the left side of the lateral legs 45, when the switch rapidly snaps to closed position. The pressure between contacts 53 and 54 is adjustable by means of stop 62, while stop 63 cooperates with stop 58 to limit the extent of contact-opening movement of the switch. A casing 64 houses the operating mechanism of the regulator and is secured by screws 65 to the body 16.

In operation, the new regulator of this invention responds to an increase in the temperature in the oven 10 in accordance with the expansion of the thermostatic liquid in bulb 19, this expansion being communicated by the liquid column in capillary tube 20 to the chamber 27 which accordingly increases in volume due to the compression of bellows 24. This movement of bellows 24 is communicated to rod 29 and nut 32, which move to the right, as seen in Figure 2, to release the bar 47 of switch 43 which accordingly snaps from the closed position of Figure 4 to the open position illustrated in Figure 5 to disconnect the heaters 11 and 12 from the line. Because this movement of the bar 47 is in a direction opposite to the opening movement of the switch contacts 53 the action of the switch is positive, so that there is no fluttering or "telegraphing" of the switch and consequently the liability of burning of the switch contacts for that reason is eliminated.

Subsequent cooling of the oven 10 below the predetermined temperature set on dial 40 causes the thermostatic liquid in bulb 19 to contract and bellows 24 to distend, moving rod 29 and nut 32 to the left to swing bar 47 to the left to snap switch 43 into circuit-closing position. Adjustment of nut 32 along rod 29 by knob 18, determines the amount of movement of the nut 32 to the left that is necessary to snap switch 43 to closed position, and since this movement depends upon the temperature in the oven, the temperature at which the switch 43 operates may be pre-set by varying the position of nut 32 on rod 29 at will by means of knob 18, the dial 40 of which is calibrated accordingly.

When the outside heaters 13 are turned on the considerable heat emanating therefrom expands the thermostatic liquid in chamber 27 so that the bellows is contracted to move the nut 32 to the right, as though the oven temperature increased, whereas it remained unchanged. However, the compensating thermostat 60, also responding to this extraneous heat, bends to the right away from bar 47 to follow up the false movement of the nut 32 to prevent the opening of the switch 43, and thus the effect of the extraneous temperatures on the regulator are nullified. The reverse action takes place when the exterior heaters 13 are turned off, so that in any event, the regulator is self-compensating for outside temperatures from any source.

It will be apparent that since the bulb within the oven and the expansible chamber of the controller are connected by the flexible capillary tube 20, the bulb may be mounted within the oven at the most advantageous point from the standpoint of response to changes of temperature therein, no limitation upon the position of the bulb in the oven being imposed by the construction of the instrument and the location desired for the controlling handle 18. Also, the construction employed in connection with the movement of the electric contact is such that a quick break of the circuit is effected, the contacts are held firmly in both the open and closed positions, and the first portion of the movement of the bar 47 and leg 46 in the direction for opening the contacts results in greater pressure of the movable contacts upon the stationary ones and in that way reduces the possibility of chattering at the contacts with resulting arcing.

While a preferred embodiment of this invention has been illustrated and described herein, it is to be understood that the invention is not limited thereby, but is susceptible of various changes of form and detail within its scope.

I claim:

1. In a thermostatic switch, a closed system comprising an expansible and contractible chamber, a thermoresponsive liquid completely filling the system and retaining its liquidity throughout the range of temperature changes to which the switch is submitted, an actuator operatively connected to the chamber, a snap switch controlled by said actuator, a compensating thermostat connecting the actuator and the snap switch to vary the operation of the switch in accordance with the effect of temperature changes on said compensating thermostat, and manual adjusting means to permit changing the relative position of the actuator and the chamber without exerting pressure on the chamber by the actuator.

2. In a thermostatic switch, a closed system comprising an expansible and contractible chamber, a thermoresponsive liquid completely filling the system and retaining its liquidity throughout the range of temperature changes to which the switch is submitted, an actuator operatively connected to the chamber, a snap switch operated by said actuator, a bimetallic compensating thermostatic strip connecting the actuator to the switch to vary the operation of the switch in accordance with the effect of temperature changes on the bimetallic thermostat and manual adjusting means to permit changing the relative position of the actuator and the chamber without exerting pressure on the chamber by the actuator.

3. In a thermostatic switch, a closed system comprising a bellows, a casing in which said bellows is arranged, a thermoresponsive liquid completely filling said system and retaining its liquidity throughout the range of temperature changes to which the switch is submitted, an actuator operatively connected to said bellows, a snap switch in said casing, a bimetallic compensating thermostatic strip connecting said actuator and the switch to vary the operation of the switch in accordance with temperature changes in said casing, and an adjusting means exterior of the casing to permit changing the relative position of the actuator and the bellows without exerting pressure on the bellows by the actuator.

4. In a thermostatic switch, a closed system comprising an expansible and contractible chamber, a thermoresponsive liquid completely filling the system and retaining its liquidity throughout the range of temperature changes to which the switch is submitted, an actuator operatively connected to the chamber, a circuit closing device controlled by said actuator, a compensating thermostat connecting the actuator and the circuit closing device to vary the operation of said device in accordance with the effect of temperature changes on said compensating thermostat, and manual adjusting means to permit changing the relative position of the actuator and the chamber without exerting pressure on the chamber by the actuator.

5. In a thermostatic switch, a closed system comprising an expansible and contractible chamber, a thermoresponsive liquid completely filling the system and retaining its liquidity throughout the range of temperature changes to which the switch is submitted, an actuator operatively connected to the chamber, a circuit closing device operated by said actuator, a bimetallic compensating thermostatic strip connecting the actuator to the circuit closing device to vary the operation of said device in accordance with the effect of temperature changes on the bimetallic thermostat, and manual adjusting means to permit changing the relative position of the actuator and the chamber without exerting pressure on the chamber by the actuator.

6. In a thermostatic switch, a closed system comprising a bellows, a casing in which said bellows is arranged, a thermoresponsive liquid completely filling said system and retaining its liquidity throughout the range of temperature changes to which the switch is submitted, an actuator operatively connected to said bellows, a circuit closing device in said casing, a bimetallic compensating thermostatic strip connecting said actuator and circuit closing device to vary the operation of said device in accordance with temperature changes in said casing, and an adjusting means exterior of the casing to permit changing the relative position of the actuator and the bellows without exerting pressure on the bellows by the actuator.

7. In a thermostatic switch, a closed system comprising an expansible and contractible chamber, a bulb communicating with the chamber, a thermoresponsive liquid completely filling the system and retaining its liquidity throughout the range of temperature changes to which the bulb is subjected, a threaded member connected to the chamber, a second member coaxial with the first member and having a threaded connection therewith, a dial for rotating the second member to adjust said threaded connection, a lever pivoted near one end and operatively connected intermediate its ends to the second member between the dial and the chamber, a circuit closing device controlled by the lever, a spring cooperating with the lever and normally urging the same in a direction for moving said device away from the circuit closing position, and a second spring biasing the lever in the opposite direction to move said device toward its circuit closing position.

8. In a thermostatic switch, a casing, a closed system including an expansible and contractible chamber in the casing and a bulb communicating with the chamber, a thermoresponsive liquid completely filling the system and retaining its liquidity throughout the range of temperature changes to which the bulb is subjected, a threaded member in the casing connected to the chamber and extending toward the front wall of the casing, a second member in the casing coaxial with the first member and having a threaded connection therewith, a dial outside the casing coaxial with said members for rotating the second member to adjust said threaded connection, a lever pivoted in the casing and extending substantially perpendicular to the axis of said members, said lever having a passage therein through which one of the members extends, means connecting the lever intermediate its ends to the second member between the dial and the chamber, and a circuit closing device controlled by the lever.

9. In a thermostatic switch, a closed system comprising an expansible and contractible chamber, a bulb communicating with the chamber, a thermoresponsive liquid completely filling the system and retaining its liquidity throughout the range of temperature changes to which the bulb is subjected, a threaded member connected to the chamber, a lever, a device movable thereby between circuit closing and circuit opening positions, a second member coaxial with the first member having a threaded connection therewith and movable by the chamber into and out of engagement with said lever, the chamber being operable to move the second member into engagement with the lever to move said device to its circuit closing position upon a decrease in the temperature of the bulb, and a dial for adjusting the threaded connections between said members which may be set to different positions corresponding to different selected temperatures at which the bellows operates said second member to cause the device to move to its circuit opening position, said second member being movable by the chamber out of engagement with the lever upon an increase in the temperature of the bulb above that for which the dial is set.

10. A snap switch comprising the combination of a tension member and an adjacent compression member, each operatively mounted at one end and connected together at their opposite ends which are free to move, at least one of said members comprising spring means, said members having different radii of action and being so mounted that said connected end portion is movable, the relative positions of said mounting points being changeable with respect to each other, said members being so arranged that said connected end portion moves with a snap action as said mounting point of the compression member and the tension center line of the tension member cross, the element on which said compression member is operatively mounted being operatively independent of the element on which the tension member is operatively mounted, and a thermo-responsive element operatively connected with the mounting of at least either said tension or said compression member to cause the crossing of said mounting point of the compression member and the tension center line of the tension member, the combination being so arranged that the movement of the thermo-responsive element with changes in temperature causes said connected end to move with a snap action at predetermined temperatures.

11. A thermo-responsive snap switch comprising in combination a tension strip operatively mounted at one end thereof with the other end free to move, an adjacent strip spring having one end connected with the free end of the tension strip, the opposite end of said strip spring being pivoted at a point laterally adjacent the tension strip and in such relation to the connected end thereof that said strip spring is in longitudinal compression, a thermo-responsive member, means whereby at least either the mounting for said tension strip or said pivot point is operatively connected to said thermo-responsive member to cause said pivot point and the tension center line of the tension strip to cross with changes in temperature of said thermo-responsive member, said construction being so arranged that said connected end moves with a snap action at predetermined temperatures of the said thermo-responsive member, the element on which the strip spring is pivoted being operatively independent of the element on which the tension strip is operatively mounted.

EDWARD L. FONSECA.